(12) United States Patent
Charles et al.

(10) Patent No.: US 11,561,699 B2
(45) Date of Patent: Jan. 24, 2023

(54) INPUT-OUTPUT PATH SELECTION USING SWITCH TOPOLOGY INFORMATION

(71) Applicant: EMC IP Holding Company LLC, Hopkinton, MA (US)

(72) Inventors: Peniel Charles, Bangalore (IN); Joseph G. Kanjirathinkal, Cary, NC (US); Owen Crowley, Carrigaline (IE); Manikandan Sethuraman, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 158 days.

(21) Appl. No.: 16/857,381

(22) Filed: Apr. 24, 2020

(65) Prior Publication Data

US 2021/0334010 A1 Oct. 28, 2021

(51) Int. Cl.
*G06F 13/12* (2006.01)
*G06F 3/06* (2006.01)
*G06F 13/40* (2006.01)

(52) U.S. Cl.
CPC ............ *G06F 3/0613* (2013.01); *G06F 3/067* (2013.01); *G06F 3/0659* (2013.01); *G06F 13/4022* (2013.01)

(58) Field of Classification Search
None
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |
| 7,668,981 B1 | 2/2010 | Nagineni et al. | |
| 7,770,053 B1 | 8/2010 | Bappe et al. | |

(Continued)

FOREIGN PATENT DOCUMENTS

| CN | 103677927 B | 2/2017 |
|---|---|---|
| EP | 1117028 A2 | 7/2001 |

(Continued)

OTHER PUBLICATIONS

Kris Piepho, "Dell EMC SC Series Storage: Microsoft Multipath I/O," Dell EMC Best Practices, Jan. 2017, 57 pages.

(Continued)

*Primary Examiner* — Henry Tsai
*Assistant Examiner* — Dean Phan
(74) *Attorney, Agent, or Firm* — Ryan, Mason & Lewis, LLP

(57) ABSTRACT

Switch topology-aware path selection in an information processing system is provided. For example, an apparatus comprises a host device comprising a processor coupled to a memory. The host device is configured to communicate with a storage system over a network with a plurality of switches. The host device is further configured to obtain topology information associated with the plurality of switches in the network, and select a path from the host device to the storage system through one or more of the plurality of switches based at least in part on the obtained topology information.

20 Claims, 6 Drawing Sheets

(56) References Cited

U.S. PATENT DOCUMENTS

| | | |
|---|---|---|
| 7,809,912 B1 | 10/2010 | Raizen et al. |
| 7,818,428 B1 | 10/2010 | Lavallee et al. |
| 7,890,664 B1 | 2/2011 | Tao et al. |
| 7,904,681 B1 | 3/2011 | Bappe et al. |
| 7,925,872 B2 | 4/2011 | Lai et al. |
| 7,930,583 B1 * | 4/2011 | Vemuri ............... G06F 11/079 714/4.1 |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,143,435 B1 * | 9/2015 | Ramamoorthy ...... H04L 45/123 |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 2002/0023151 A1 | 2/2002 | Iwatani |
| 2002/0103923 A1 | 8/2002 | Cherian et al. |
| 2002/0156883 A1 * | 10/2002 | Natarajan ............... H04L 41/08 709/224 |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salli |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0260121 A1 * | 10/2012 | Yadav ............... G06F 11/2005 714/2 |
| 2013/0117766 A1 | 5/2013 | Bax et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |

FOREIGN PATENT DOCUMENTS

| | | |
|---|---|---|
| EP | 2667569 A1 | 11/2013 |
| WO | PCT/US2019/052549 | 12/2019 |
| WO | PCT/US2019/053204 | 12/2019 |
| WO | PCT/US2019/053473 | 12/2019 |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 15/795,653 filed in the name of Maneesh Pusalkar et al. on Oct. 27, 2017, and entitled "Storage System with Network-Wide Configurable Device Names."

U.S. Appl. No. 16/697,393 filed in the name of Vinay G. Rao et al. on Nov. 27, 2019, and entitled "Automated Seamless Migration of Logical Storage Devices."

U.S. Appl. No. 16/710,828 filed in the name of Amit Pundalik Anchi et al. on Dec. 11, 2019, and entitled "Automated Seamless Migration with Signature Issue Resolution."

* cited by examiner

INPUT-OUTPUT PATH SELECTION USING SWITCH TOPOLOGY INFORMATION

FIELD

The field relates generally to information processing systems, and more particularly to input-output path selection in information processing systems.

BACKGROUND

Storage arrays and other types of storage systems are often shared by multiple host devices over a network such as, for example, a storage area network (SAN). Applications running on the host devices each include one or more processes that perform the application functionality. The processes issue input-output (IO) operations, directed to particular logical storage volumes or other logical storage devices (referred to as LUNs), for delivery by the host devices over selected paths to storage ports of the storage system. Different ones of the host devices can run different applications with varying workloads and associated TO patterns. Various types of storage access protocols can be used by host devices to access the logical storage volumes or other logical storage devices of the storage system.

In a data center implementation, storage to host connectivity is usually via a SAN fabric. SAN fabric configurations can consist of multiple fabric switches (e.g., multiple switches) with LUNs made visible to a host through multiple paths based on zone configuration and physical connectivity. In the event of path failures, TO are retried on a path not likely to exhibit the failure. This is sometimes referred to as TO failover. However, selecting such a path can present significant challenges.

SUMMARY

Illustrative embodiments provide switch topology-aware path selection in an information processing system.

For example, in one embodiment, an apparatus comprises a host device comprising a processor coupled to a memory. The host device is configured to communicate with a storage system over a network with a plurality of switches. The host device is further configured to obtain topology information associated with the plurality of switches in the network, and select a path from the host device to the storage system through one or more of the plurality of switches based at least in part on the obtained topology information.

In some illustrative embodiments, the selection of a path from the host device to the storage system through one or more of the plurality of switches based at least in part on the obtained topology information is performed in response to a failure of another path.

In further illustrative embodiments, the selection of a path from the host device to the storage system through one or more of the plurality of switches based at least in part on the obtained topology information is performed for a given input-output operation associated with the host device.

In yet other illustrative embodiments, the topology information comprises connectivity information associated with each of the plurality of switches. The connectivity information associated with each of the plurality of switches may comprise at least one identifier. A portion of the identifier is unique for a given path initiator connected to the same switch. The identifier enables the host device to select a path that avoids one or more of the plurality of switches. Furthermore, in some embodiments, the switches in the plurality of switches are distributed in multiple fabrics.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
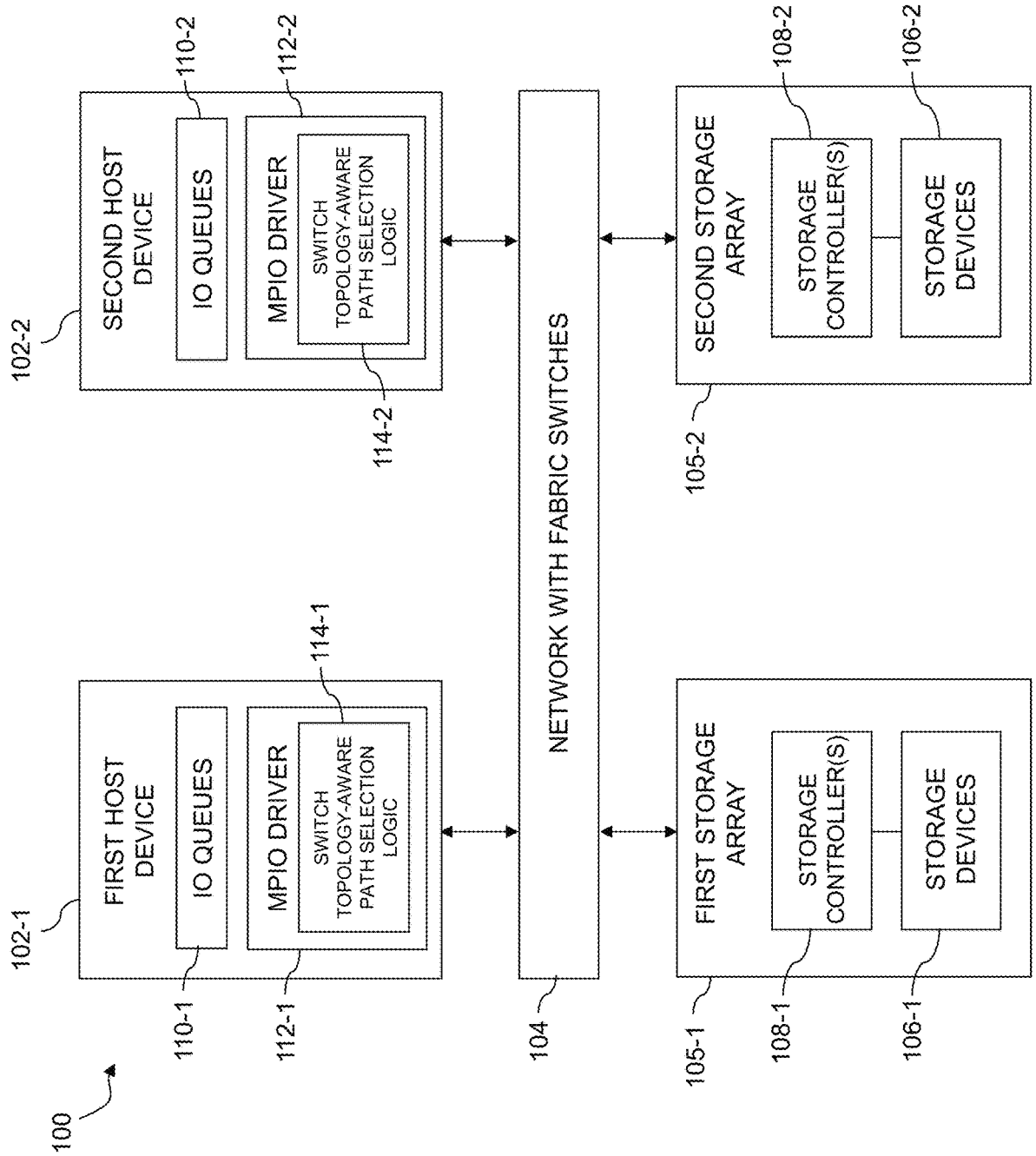
FIG. 1 depicts an information processing system with switch topology-aware path selection according to an illustrative embodiment.

FIG. 1 shows an information processing system 100 configured in accordance with an illustrative embodiment. The information processing system 100 comprises at least first and second host devices 102-1 and 102-2, collectively referred to herein as host devices 102. The host devices 102 are coupled to a network 104 that comprises one or more fabric switches. The host devices 102 communicate over the network 104 via the one or more fabric switches with at least first and second storage arrays 105-1 and 105-2, collectively referred to herein as storage arrays 105. For example, the network 104 illustratively comprises at least one storage area network (SAN) and the one or more fabrics switches illustratively comprise respective distinct fabric switches of a set of multiple fabric switches interconnecting the host devices 102 with the storage arrays 105 over the one or more SANs. Each of the one or more fabric switches in some embodiments is associated with a different SAN.

The system 100 may be configured such that the first host device 102-1 communicates with the first storage array 105-1 over a first fabric switch and communicates with the second storage array 105-2 over a second fabric switch. Similarly, the second host device 102-2 can communicate with the first storage array 105-1 over the first fabric switch and communicate with the second storage array 105-2 over the second fabric switch. Numerous other interconnection arrangements are possible. Note also that, in various embodiments, the network 104 can comprise one or more fabrics, each fabric having one or more switches.

Also, other types of networks can be used in other embodiments, and references to SANs, switches, fabrics or other particular network arrangements herein are for purposes of illustration only, as non-limiting examples.

Although only two host devices 102 and two storage arrays 105 are shown in the figure, this is by way of illustrative example only, and other embodiments can include additional instances of such elements. It is also possible that alternative embodiments may include only a single host device.

The host devices 102 illustratively comprise respective computers, servers or other types of processing devices configured to communicate with the storage arrays 105 over the network 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 may be implemented using multiple networks of different types to interconnect the various components of the information processing system 100. For example, the network 104 may comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) and/or other types of communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel (FC). Numerous alternative networking arrangements are possible in a given embodiment, as will be appreciated by those skilled in the art.

Although illustratively shown as separate from the network 104 in the figure, at least portions of the storage arrays 105 may be considered part of the network 104 in some embodiments. For example, in embodiments in which the network 104 comprises at least one SAN, the storage arrays 105 may be viewed as part of the one or more SANs.

The storage arrays 105-1 and 105-2 comprise respective sets of storage devices 106-1 and 106-2, collectively referred to herein as storage devices 106, coupled to respective storage controllers 108-1 and 108-2, collectively referred to herein as storage controllers 108.

The storage devices 106 of the storage arrays 105 illustratively comprise solid state drives (SSDs). Such SSDs in some embodiments are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, at least one of the storage arrays 105 illustratively comprises one or more VNX®, VMAX®, Unity™ or PowerMax™ storage arrays, as well as other commercially available storage arrays from Dell EMC of Hopkinton, Mass.

As another example, one or both of the storage arrays 105 may comprise respective clustered storage systems, each including a plurality of storage nodes interconnected by one or more networks. An example of a clustered storage system of this type is an XtremIO™ storage array from Dell EMC, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

As mentioned above, communications between the host devices 102 and the storage arrays 105 within the system 100 may utilize PCIe connections or other types of connections implemented over one or more networks such as network 104. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 105 in some embodiments may be implemented as part of cloud infrastructure in the form of a cloud-based system such as an Amazon Web Services (AWS) system. Other examples of cloud-based systems that can be used to provide at least portions of the storage arrays 105 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

The storage devices 106 of the storage arrays 105 are configured to store data utilized by one or more applications running on one or more of the host devices 102. The storage devices 106 on the storage arrays 105 are illustratively arranged in one or more storage pools. The storage arrays 105 and their corresponding storage devices 106 are examples of what are more generally referred to herein as "storage systems." A given such storage system in the present embodiment may be shared by the host devices 102, and in such arrangements may be referred to as a "shared storage system."

The storage devices 106 of the storage arrays 105 implement logical units (LUNs) configured to store objects for users associated with the host devices 102. These objects can comprise files, blocks or other types of objects. The host devices 102 interact with the storage arrays 105 utilizing read and write commands as well as other types of commands that are transmitted over the network 104.

Such commands in some embodiments more particularly comprise SCSI commands, although other types of commands may be used in other embodiments, including commands that are part of a standard command set, or custom commands such as a "vendor unique command" or VU command that is not part of a standard command set.

A given IO operation as that term is broadly used herein illustratively comprises one or more such commands. References herein to terms such as "input-output" and "IO" should be understood to refer to input and/or output. Thus, an IO operation relates to at least one of input and output. For example, an IO operation can comprise at least one read IO operation and/or at least one write IO operation. More particularly, IO operations may comprise write requests and/or read requests directed to stored data of a given one of the storage arrays 105.

Each IO operation is assumed to comprise one or more commands for instructing at least one of the storage arrays 105 to perform particular types of storage-related functions such as reading data from or writing data to particular logical storage volumes or other logical storage devices of one or more of the storage arrays 105. Such commands are assumed to have various payload sizes associated therewith, and the payload associated with a given command is referred to herein as its "command payload."

A command directed by the host device 102-1 to one of the storage arrays 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

Also, the term "storage device" as broadly used herein can encompass, for example, a logical storage device such as a LUN or other logical storage volume. A logical storage device can be defined in the storage arrays 105 to include different portions of one or more physical storage devices. The storage devices 106 may therefore be viewed as comprising respective LUNs or other logical storage volumes. Logical storage devices are also referred to herein as simply "logical devices."

Each of the host devices 102 illustratively has multiple paths to each of the storage arrays 105 via the network 104, with at least one of the storage devices 106 of one of the storage arrays 105 being visible to that host device on a given one of the paths, although numerous other arrangements are possible. A given one of the storage devices 106 may be accessible to a given host device over multiple paths. Different ones of the host devices 102 can have different numbers and types of paths to the storage arrays 105.

Different ones of the storage devices 106 of the storage arrays 105 illustratively exhibit different latencies in processing of IO operations. In some cases, the same storage device may exhibit different latencies for different ones of multiple paths over which that storage device can be accessed from a given one of the host devices 102.

The host devices 102, network 104 and storage arrays 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Additional examples of processing platforms utilized to implement storage systems and possibly one or more associated host devices in illustrative embodiments will be described in more detail below.

The host devices 102 and the storage arrays 105 may be implemented on respective distinct processing platforms, although numerous other arrangements are possible. For example, in some embodiments at least portions of the host devices 102 and the storage arrays 105 are implemented on the same processing platform. The storage arrays 105 can therefore be implemented at least in part within at least one processing platform that implements at least a subset of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage arrays 105. The storage arrays 105 can be similarly distributed across multiple data centers.

Although in some embodiments certain commands used by the host devices 102 to communicate with the storage arrays 105 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP. Combinations of two or more command protocols may also be implemented.

A given storage volume stored in storage arrays 105 in the system 100 illustratively comprises a set of one or more LUNs or other storage volumes of the storage arrays 105. Each such LUN or other storage volume is assumed to comprise at least a portion of a physical storage space of one or more of the storage devices 106 of the corresponding storage arrays 105.

The host devices 102 comprise respective sets of IO queues 110-1 and 110-2 collectively referred to as IO queues 110, and respective MPIO drivers 112-1 and 112-2 collectively referred to as MPIO drivers 112. The MPIO drivers 112 collectively comprise a multi-path layer of the host devices 102. The multi-path layer provides automated path selection functionality using respective instances of path selection logic 114-1 and 114-2 implemented within the MPIO drivers 112. In accordance with illustrative embodiments described herein, path selection logic 114-1 and 114-2 are switch topology-aware path selection logic (individually referred to as switch topology-aware path selection logic 114). That is, as will be further described herein, the path selection logic in MPIO drivers 112 is configured to take into account switch topology information in making the path selections. In this way, any IO failover decision will consider whether a given fabric switch in network 104 is a cause of the failure, and make a new path selection that avoids the failed fabric switch.

The MPIO drivers 112 may comprise, for example, otherwise conventional MPIO drivers, such as PowerPath® drivers from Dell EMC, suitably modified in the manner disclosed herein to support access path state change functionality in the storage arrays 105. Other types of MPIO drivers from other driver vendors may be suitably modified to incorporate functionality for switch topology-aware path selection as disclosed herein.

The MPIO driver 112-1 is configured to select IO operations from its corresponding set of IO queues 110-1 for delivery to the storage arrays 105 over the network 104. The sources of the IO operations stored in the set of IO queues 110-1 illustratively include respective processes of one or more applications executing on the host device 102-1. Other types of sources of IO operations may be present in a given implementation of system 100.

The paths over which the IO operations are sent from the host device 102-1 to the storage arrays 105 illustratively comprise paths associated with respective initiator-target pairs, with each initiator comprising a host bus adaptor (HBA) or other initiating entity of the host device 102-1 and each target comprising a storage array port or other targeted entity corresponding to one or more of the storage devices 106 of the storage arrays 105. As noted above, the storage devices 106 of the storage arrays 105 illustratively comprise LUNs or other types of logical storage devices.

For example, in selecting particular ones of the paths for delivery of the IO operations to the storage arrays 105, the path selection logic 114-1 of the MPIO driver 112-1 illustratively implements a path selection algorithm that selects particular ones of the paths at least in part as a function of path information such as host device HBA and storage array port, with the path selection algorithm being configured to balance the IO operations over the paths or to achieve other load balancing or performance goals.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of one of the storage arrays 105. The corresponding logical device illustratively comprises a LUN or other logical storage volume to which the particular IO operation is directed.

A given retry of a failed IO operation under such a path selection algorithm can select a path having a different host device HBA and storage array port for a given retry than that of the path selected for the original failed IO operation. However, as mentioned above, such path selection will now be switch topology-aware and thus take into account any failed fabric switch.

The paths between the host devices 102 and the storage arrays 105 can change over time. For example, the addition of one or more new paths from host device 102-1 to the storage arrays 105 or the deletion of one or more existing paths from the host device 102-1 to the storage arrays 105 may result from respective addition or deletion of at least a portion of the storage devices 106 of the storage arrays 105. Addition or deletion of paths can also occur as a result of zoning and masking changes or other types of storage system reconfigurations performed by a storage administrator or other user.

In some embodiments, paths are added or deleted in conjunction with addition of a new storage array or deletion of an existing storage array from a storage system that includes multiple storage arrays.

In these and other situations, path discovery scans may be repeated as needed in order to discover the addition of new paths or the deletion of existing paths.

A given path discovery scan can be performed utilizing functionality of MPIO drivers, such as PowerPath® drivers. These and other references to PowerPath® herein are presented by way of illustrative example only, and should not be construed as limiting in any way.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage arrays 105 as well to discover the disappearance of any existing LUNs that have been deleted from the storage arrays 105. For each of one or more new paths identified in the path discovery scan, the host device 102-1 may be configured to execute a host registration operation for that path. The host registration operation for a given new path illustratively provides notification to the corresponding one of the storage arrays 105 that the host device 102-1 has discovered the new path. Again, path selection will now be switch topology-aware and thus take into account any failed fabric switch.

As is apparent from the foregoing, MPIO driver 112-1 of host device 102-1 is configured to control delivery of IO operations from the host device 102-1 to the first and second storage arrays 105 over selected paths through the network 104.

It is assumed that the other MPIO driver 112-2 is configured in a manner similar to that described above and elsewhere herein for the first MPIO driver 112-1. The MPIO driver 112-2 is therefore similarly configured to select IO operations from its corresponding one of the sets of IO queues 110 for delivery to the storage arrays 105 over the network 104 and to perform at least portions of the disclosed functionality. Accordingly, aspects of functionality described above in the context of the first MPIO driver 112-1 and the first host device 102-1 are assumed to be similarly performed by the other MPIO driver 112-2 and the other host device 102-2.

The MPIO drivers 112 may be otherwise configured utilizing well-known MPIO functionality such as that described in "Dell EMC SC Series Storage and Microsoft Multipath I/O," Dell EMC, CML1004, July 2018, which is incorporated by reference herein. Such conventional MPIO functionality is suitably modified in illustrative embodiments disclosed herein to support switch topology-aware path selection functionality as will be further described below.

It is to be appreciated that the above-described features of system 100 and other features of other illustrative embodiments are presented by way of example only, and should not be construed as limiting in any way. Accordingly, different numbers, types and arrangements of system components such as host devices 102, network 104, storage arrays 105, storage devices 106, sets of IO queues 110, MPIO drivers 112 and instances of path selection logic 114 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Particular processing operations and other system functionality described herein are presented by way of illustrative example only, and should not be construed as limiting the scope of the disclosure in any way. Alternative embodiments can use other types of processing operations involving host devices, storage systems and access path state change functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements within a given information processing system.

Functionality can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 2:
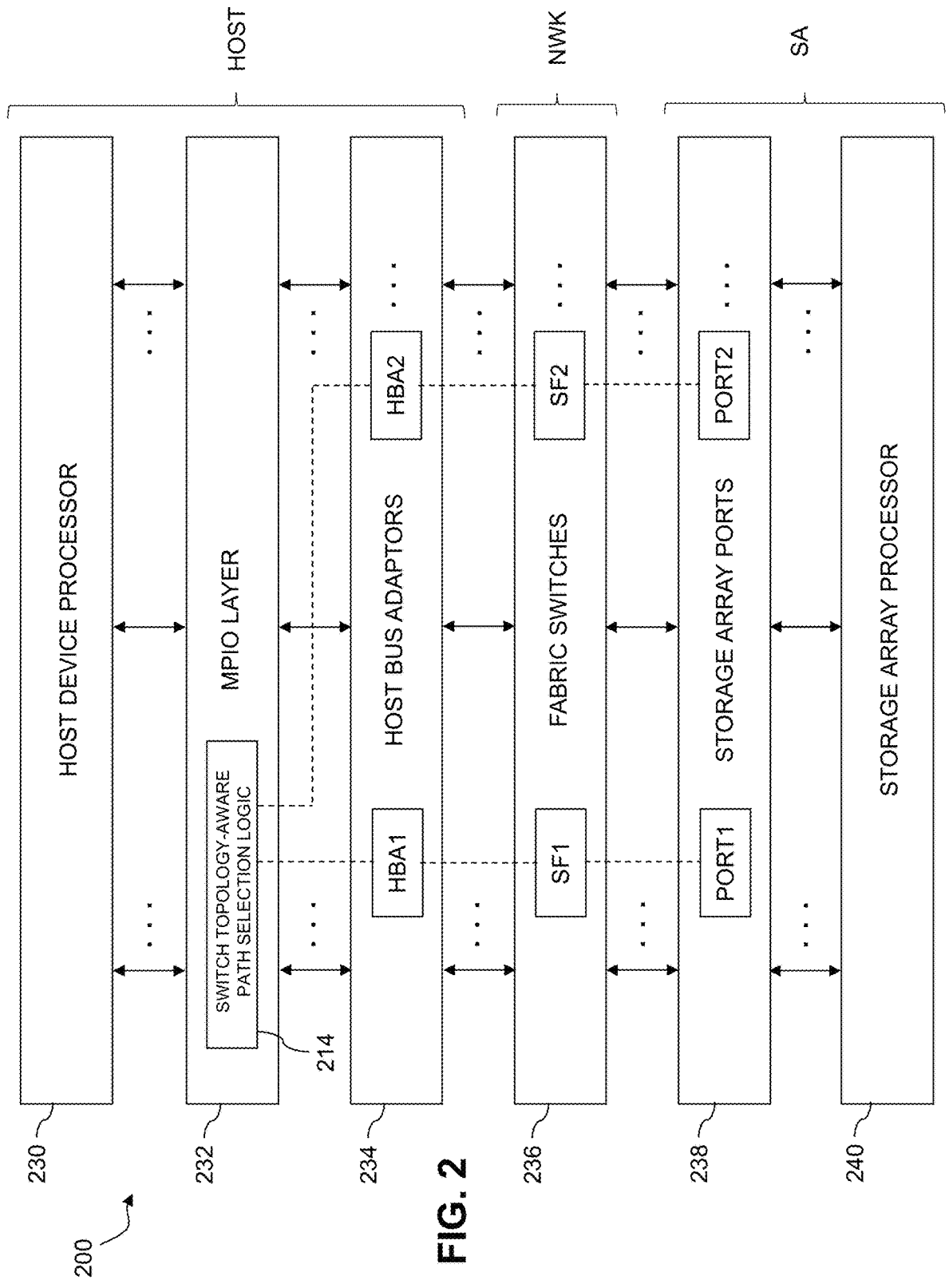
FIG. 2 depicts an information processing system with switch topology-aware path selection according to another illustrative embodiment.

Referring now to FIG. 2, another illustrative embodiment is shown. In this embodiment, an information processing system 200 comprises host-side switch topology-aware path selection logic 214. The system 200 is configured in accordance with a layered system architecture that illustratively includes a host device processor layer 230, an MPIO layer 232, an HBA layer 234, a fabric switch layer 236, a storage array port layer 238 and a storage array processor layer 240. As illustrated in the figure, the host device processor layer 230, the MPIO layer 232 and the HBA layer 234 are associated with one or more host devices ("HOST"), the fabric switch layer 236 is associated with one or more SANs or other types of networks ("NWK"), and the storage array port layer 238 and storage array processor layer 240 are associated with one or more storage arrays ("SA"). It is to be appreciated that a storage array processor (note that a given storage array may typically have multiple storage array processors) is also referred to herein as a storage controller.

The system 200 in this embodiment implements switch topology-aware path selection functionalities assumed to be controlled at least in part by host-side switch topology-aware path selection logic 214, although other arrangements are possible. Switch topology-aware path selection functionalities will be described in detail below in the context of FIGS. 3, 4 and 5.

The MPIO layer 232 is an example of what is also referred to herein as a multi-path layer, and comprises one or more MPIO drivers implemented in respective host devices. Each such MPIO driver illustratively comprises an instance of switch topology-aware path selection logic 214 configured to perform switch topology-aware path selection for delivery of IO operations to the storage arrays of system 200 as previously described.

In the system 200, switch topology-aware path selection logic 214 is configured to select different paths for sending IO operations from a given host device to a storage array. These paths as illustrated in the figure include a first path from a particular HBA denoted HBA1 through a particular fabric switch denoted SF1 to a particular storage array port denoted PORT1, and a second path from another particular HBA denoted HBA2 through another particular fabric switch denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switches, fabrics and storage array ports. For example, each host device in the FIG. 2 embodiment can illustratively have a set of n paths to a shared storage array, or alternatively different ones of the host devices can have different numbers and types of paths to the storage array.

The switch topology-aware path selection logic 214 of the MPIO layer 232 in this embodiment therefore selects paths for delivery of IO operations to the one or more storage arrays having the storage array ports of the storage array port layer 238.

Some implementations of the system 200 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of IO host devices per port. The HBAs of the host devices are assumed to be zoned and masked to the storage array ports in accordance with the predicted performance needs, including user load predictions.

A given host device of system 200 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths. During path selection, particularly when an IO failover decision is made, switch topology information is taken into account to make the path selection decision in a manner that avoids any failed fabric switch. Such switch topology-aware path selection functionalities will now be further described.

As mentioned above, in the event of a path failure, an IO is retried on a path which is not likely to exhibit the failure (i.e., most uncommon endpoint to the failure).

By way of one example, assume a configuration wherein LUNs are being accessed via two ports from two storage controllers of a given storage array as follows: Controller 1-Port 0; Controller 1-Port 1; Controller 2-Port 0; and Controller 2-Port 1. In the event that there is a path failure with respect to the Controller 1-Port 0 IT Nexus, IO directed to the affected path will fail and multipathing software (e.g., MPIO driver 112) running on the host device will retry this failed IO on the path from Controller 2 to Port 1 instead of retrying IO on the path from Controller 1 to Port 1. This approach of failing over of IO to a most uncommon endpoint increases the probability of IO success and reduces failover time, particularly when there is controller/director failure. However, in the above existing approach, an uncommon endpoint will result in continued path failure if the failure is due to a fabric switch where these array ports are connected.

Figure 3A:
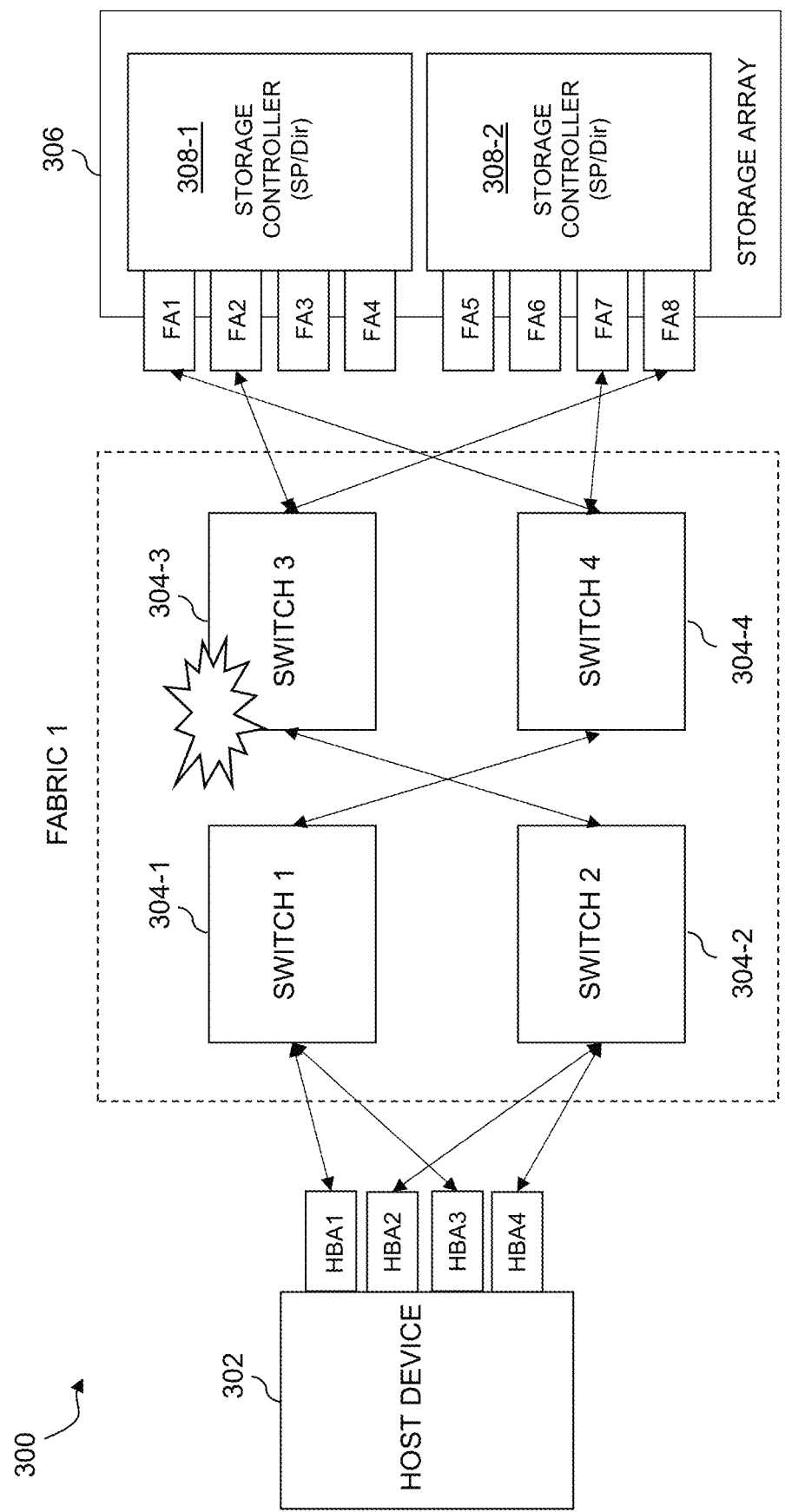
FIG. 3A depicts an example of an information processing system with which switch topology-aware path selection according to an illustrative embodiment can be implemented.

This issue is further illustrated with information processing system 300 in FIG. 3A. Assume the following configuration as depicted in FIG. 3A:

(i) Host device 302 has four HBA ports: HBA1; HBA2; HBA3; and HBA4;

(ii) The host device 302 is provisioned with SAN devices from a storage array 306 via two different storage controllers (also referred to as storage processor (SP)/director (Dir)) 308-1 and 308-2 wherein storage controller 308-1 has four target ports: FA1; FA2; FA3; and FA4, and storage controller 308-2 has four target ports: FA5; FA6; FA7; and FA8. The network connecting the host device 302 and the storage array 306 includes a single fabric (Fabric 1) with four fabric switches: switch 1 (304-1); switch 2 (304-2); switch 3 (304-3); and switch 4 (304-4). As further shown, assume that LUNs are accessed via multiple paths: Path1: HBA1→FA1; Path 2: HBA2→FA2; Path 3: HBA3→FA7; and Path 4: HBA4→FA8.

Furthermore, assume the following:

(i) The host device 302 detects a path failure on Path1: HBA1 (switch 1)→FA1 (switch 3).

(ii) The multipathing software (e.g., MPIO driver 112) on the host device 302 attempts IO failover to an uncommon endpoint, i.e., failed IO will be retried on the furthermost target port FA8.

(iii) Since the existing multipathing software is unaware of physical switch topology, it would consider only the storage array's port hierarchy and attempts to retry the failed IO on the furthermost port (different SP/Dir and different port).

(iv) However, assuming the path failure was due to an issue on switch 3 (denoted by the symbol over switch 304-3), IO will fail on the FA8 port as well.

In accordance with illustrative embodiments, by configuring the multipathing software to be aware of the fabric switch topology (e.g., in accordance with switch topology-aware path selection logic, 114 in FIGS. 1 and 214 in FIG. 2), the failed IO in the FIG. 3A example can be directed immediately after the initial failure to FA7 (switch 4) which is from a different SP/Dir and connected to different switch (304-4). Thus, as shown in FIG. 3A, the IO failover path will now be HBA1 (switch 1)→FA7 (switch 4). Note that not every possible switch interconnection in Fabric 1 is expressly shown in FIG. 3A.

Figure 3B:
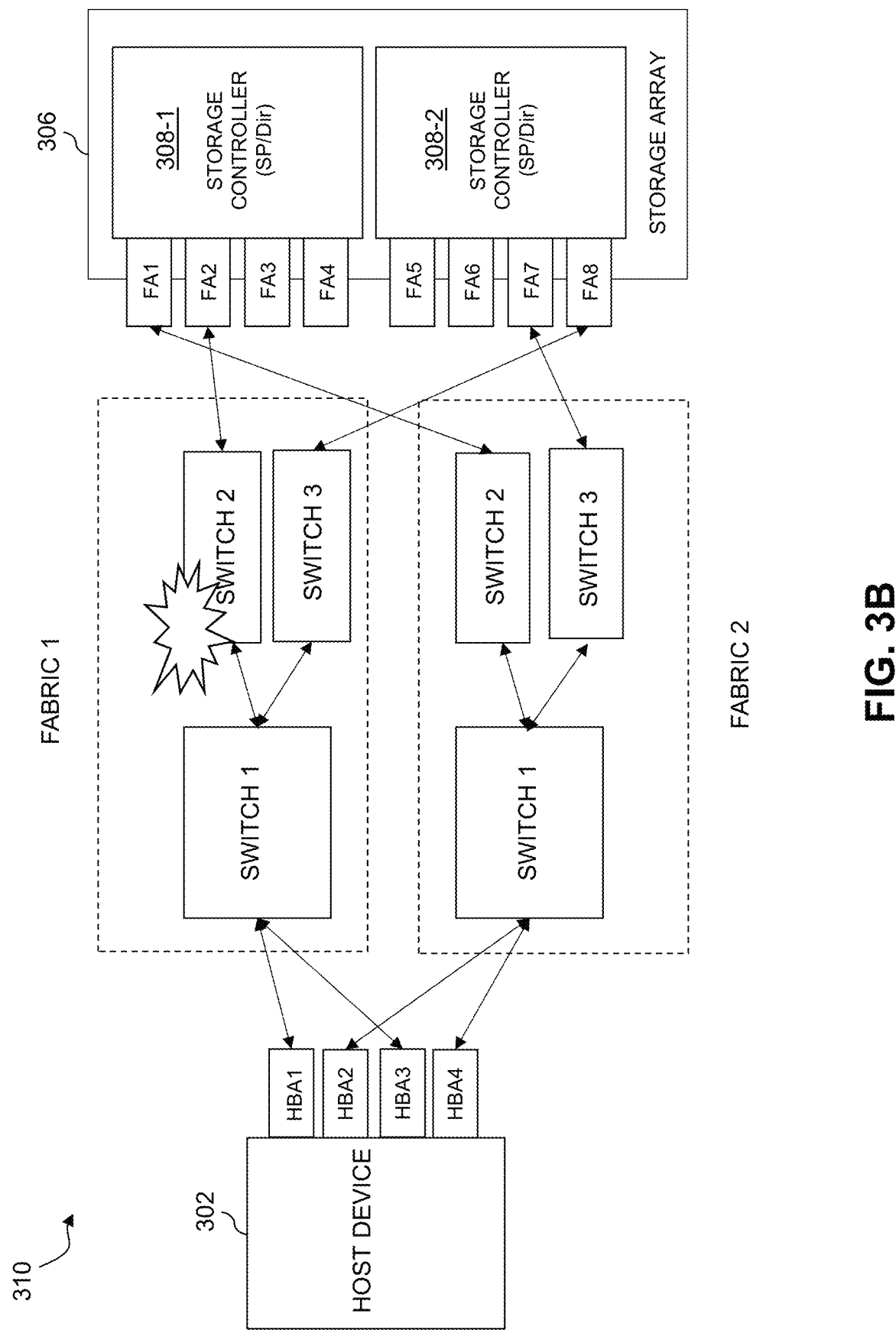
FIG. 3B depicts another example of an information processing system with which switch topology-aware path selection according to an illustrative embodiment can be implemented.

While FIG. 3A shows an example with a single fabric (Fabric 1), information processing system 310 in FIG. 3B shows a similar example but with multiple fabrics, i.e., Fabric 1 and Fabric 2, wherein each fabric comprises its own set of switches. More particularly, each of Fabric 1 and Fabric 2 includes switch 1, switch 2 and switch 3. Thus, assuming that it is determined that switch 2 in Fabric 1 is a cause of a failure, then the host device 302 can select an IO failover path to storage array 306 through Fabric 2, e.g., HBA2 (fabric 2 switch 1)→FA7 (fabric 2 switch 3). Note that not every possible switch interconnection in Fabric 1 or Fabric 2 is expressly shown in FIG. 3B.

More particularly, illustrative embodiments provide a methodology in which multipathing software is configured to understand physical connectivity using fabric switch identifiers, e.g., Fibre Channel identifiers (FCIDs), and to perform failover by considering fabric switch connectivity along with storage array port hierarchy. One nonlimiting example of multipathing software with which illustrative embodiments can be implemented is PowerPath® from Dell EMC of Hopkinton Mass.

Figure 4:
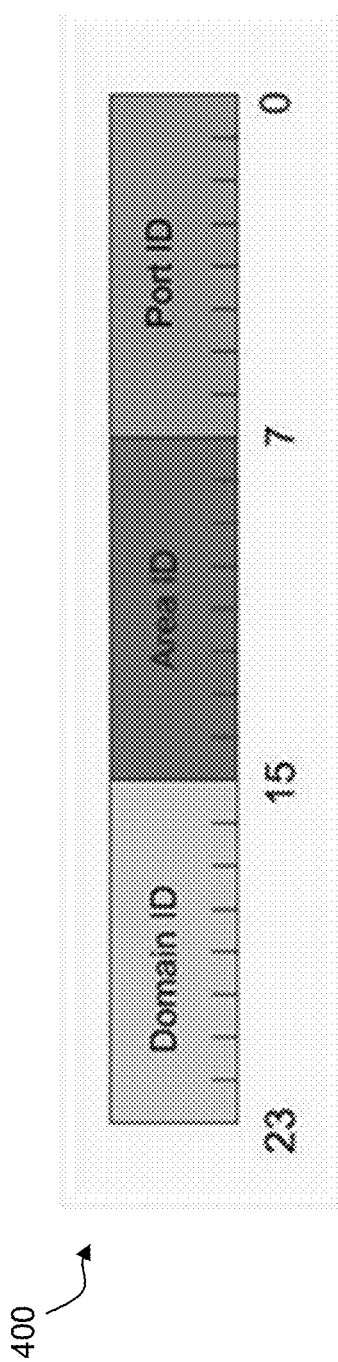
FIG. 4 depicts a fabric switch identifier with which one or more illustrative embodiments can be implemented.

As illustratively depicted in FIG. 4, a fabric switch identifier 400 in the form of an FCID is 24 bit or 3-byte address assigned automatically to each node port by the switch fabric. Note that, similar to HBAs of a host device and target ports of a storage array, each fabric switch has a plurality of ports called node ports. Port ID comprises the first byte (bits 0-7), Area ID comprises the second byte (bits 8-15) and Domain ID comprises the third byte (bits 16-23). Domain ID is unique for all initiators (i.e., host bus adaptors or HBAs) connected to the same switch. Thus, it is to be appreciated that FCID information is an example of switch topology information, and by configuring a host device (e.g., including logic therein) to obtain and utilize such FCID information, the host device is able to perform switch topology-aware path selection as described herein according to illustrative embodiments.

If two initiators are connected to the same switch, it can be seen that the Domain ID field in the FCID is the same. If Domain IDs are different for two different initiator/target pairs, it can be concluded that they are not connected to the same switch. An initiator/target pair typically includes an HBA of the host device and a target port of a storage array controller.

With this information, illustrative embodiments enable the multipathing software to consider failing over IO to a port which is not connected to the same switch.

In illustrative embodiments, FCID for both the initiator and the target can be extracted by the host device using utilities such as fcinfo. For example, switch topology-aware path selection logic 114/214 can be configured to execute the fcinfo utility to obtain FCID and/or receive FCID from another part of the host device which executes the fcinfo utility.

A sample FCID Output is shown below. The output has information of both initiator FCID and target ports FCID (e.g., Symmetrix™ storage array available from Dell EMC). An output snippet from the host device is as follows:

```
WWN (World Wide Name) of host:
    com.qlogic-QLE2562-0: PortWWN: 21:00:00:24:ff:48:cf:01   \\.\Scsi1:
    com.qlogic-QLE2562-1: PortWWN: 21:00:00:24:ff:48:cf:00   \\.\Scsi3:
C:\>fcinfo.exe /ports /details
            com.qlogic-QLE2562-0, num: 13
    ------------------------------------------------------------------------
            NodeWWN               : 20:00:00:24:ff:48:cf:01
            PortWWN               : 21:00:00:24:ff:48:cf:01   --> Initiator port WWN
            PortFcId : x2f2a00                ---> --> Initiator port FCID
        PortSymbolicName:
            PortType: N_Port
            PortState: online
        PortSupportedClassofService: Class_3
            PortSpeed:
        PortMaxFrameSize: 2048
            FabricName: 10:00:00:05:33:76:48:8c
                NodeWWN: 50:00:09:73:a8:16:17:ff
                PortWWN: 50:00:09:73:a8:16:14:05   ----> Target portWWN
                PortFcId: x02c200             ---> Target port FCID
            PortSymbolicName:            SYMMETRIX::000197801413::SAF-1d
5::FC::5977_1131+::EMUL B90F000
            PortType: N_Port
            PortState: online
        PortSupportedClassofService:
            PortSpeed: unkn
        PortMaxFrameSize: 0
            FabricName: 00:00:00:00:00:00:00:00
                NodeWWN: 50:00:09:73:a8:16:17:ff
                PortWWN: 50:00:09:73:a8:16:14:45
                PortFcId: x02c300             ---> Target port FCID
            PortSymbolicName:            SYMMETRIX::000197801413::SAF-2d
5::FC::5977_1131+::EMUL B90F000
            PortType: N_Port
            PortState: online
        PortSupportedClassofService:
            PortSpeed: unkn
        PortMaxFrameSize: 0
            FabricName: 00:00:00:00:00:00:00:00
                NodeWWN: 50:00:09:73:a8:16:17:ff
                PortWWN: 50:00:09:73:a8:16:14:04
                PortFcId: x01c200
        PortSymbolicName:            SYMMETRIX::000197801413::SAF-1d
4::FC::5977_1131+::EMUL B90F000
            PortType: N_Port
            PortState: online
        PortSupportedClassofService:
            PortSpeed: unkn
        PortMaxFrameSize: 0
            FabricName: 00:00:00:00:00:00:00:00
```

Note that from the above example output, there are three target ports. With the FCID Domain ID field set to "02," it is evident that two target ports are connected to the same switch.

While FCID for both initiator and target can be extracted using utilities such as fcinfo, in accordance with alternative embodiments, there are other ways to extract FCID, e.g.: (i) using systool "systool-c fc_transport-v"; and/or (ii) using the Fabric Configuration Server-Request Command Codes such as Get Domain Identifier (GDID).

During failover, in accordance with illustrative embodiments, the multipathing software considers fabric switch identity (FCID) along with storage array port hierarchy. The multipathing software selects a path which has a target port which is uncommon and connected to a different switch than the one where failure is observed. A similar approach of failover can be achieved by considering FCIDs of initiators as well. In a case of a multi-fabric network (e.g., FIG. 3B), the multipathing software (e.g., logic 114/214) first identifies the fabric using a Get Fabric Name (GFN) command and then proceeds with the same logic as a single fabric (e.g., FIG. 3A).

Many advantages flow from illustrative embodiments, by way of example only:

(i) Failover can accurately and successfully be performed by understanding fabric switch connectivity;

(ii) Since switch connection is also considered for failover, attempting IO on failed switch fabric can be avoided and thereby have potential to reduce IO retries;

(iii) Provides advantage over native multipathing solution; and (iv) Irrespective of fabric configuration (single/multiple fabric), this solution can be applied.

Figure 5:
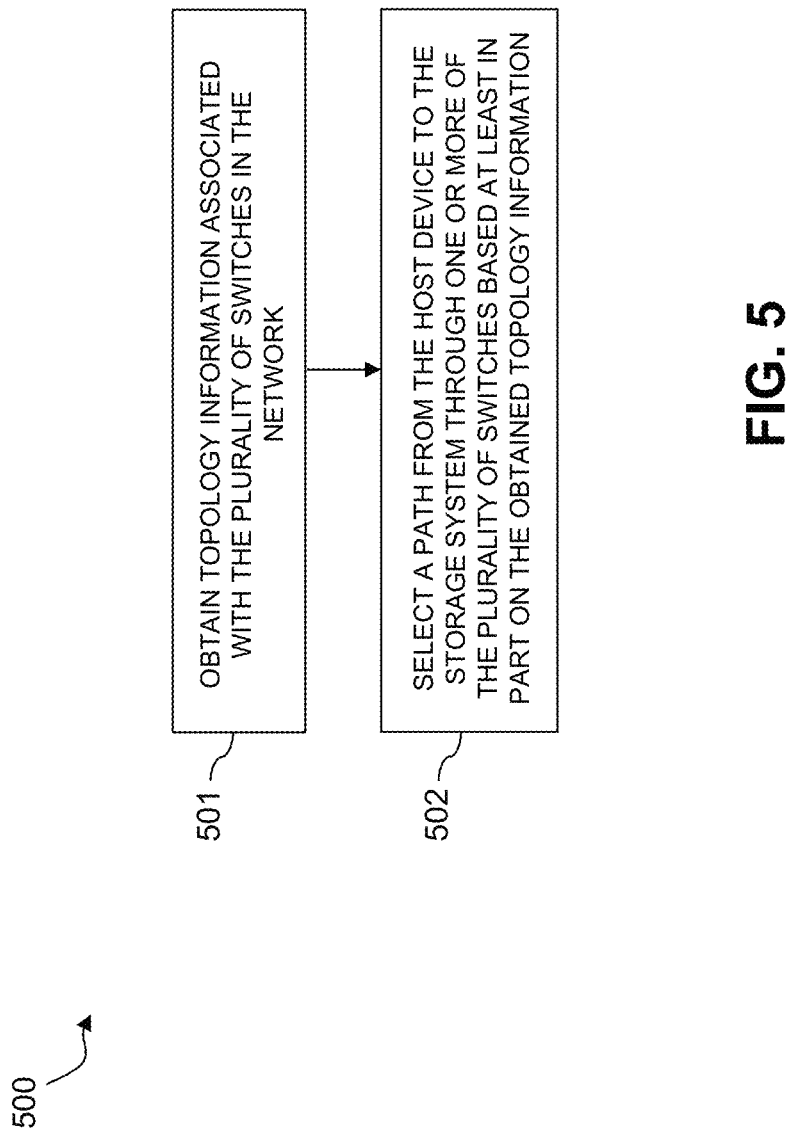
FIG. 5 depicts a switch topology-aware path selection methodology according to an illustrative embodiment.

FIG. 5 depicts a switch topology-aware path selection methodology 500 according to an illustrative embodiment. Methodology 500 can be performed in accordance with a host device comprising a processor coupled to a memory, and configured to communicate with a storage system over a network with a plurality of switches. As shown, step 501 obtains topology information associated with the plurality of switches in the network. Step 502 selects a path from the host device to the storage system through one or more of the plurality of switches based at least in part on the obtained topology information.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, multipath IO drivers, path selection logic, control logic and additional or alternative components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations.

What is claimed is:

1. An apparatus comprising:
a host device comprising a processor coupled to a memory;
the host device being configured to communicate with a storage system over a network with a plurality of switches;
the host device being further configured to:
obtain topology information associated with the plurality of switches in the network, the obtained topology information comprising switch identifiers of one or more of the plurality of switches that are in each of a plurality of paths between the host device and the storage system;
detect one or more failed ones of the plurality of paths from the host device to the storage system;
determine, based at least in part on the obtained topology information, switch identifiers for ones of the plurality of switches that are in the one or more failed ones of the plurality of paths; and
select a given one of the plurality of paths from the host device to the storage system through one or more of the plurality of switches based at least in part on the obtained topology information, the given path avoiding the ones of the plurality of switches that are in the one or more failed ones of the plurality of paths.

2. The apparatus of claim 1, wherein the selection of the given path from the host device to the storage system through one or more of the plurality of switches based at least in part on the obtained topology information is performed for a given input-output operation associated with the host device.

3. The apparatus of claim 1, wherein the topology information comprises connectivity information associated with each of the plurality of switches.

4. The apparatus of claim 3, wherein the connectivity information associated with each of the plurality of switches comprises at least one identifier.

5. The apparatus of claim 4, wherein a portion of the identifier is unique for each path initiator connected to a same one of the plurality of switches.

6. The apparatus of claim 5, wherein the identifier enables the host device to select the given path that avoids said at least one of the plurality of switches associated with the one or more failed ones of the plurality of paths.

7. The apparatus of claim 1, wherein switches of the plurality of switches are distributed among multiple fabrics.

8. A method performed by a host device configured to communicate with a storage system over a network with a plurality of switches, comprising:
obtaining topology information associated with the plurality of switches in the network, the obtained topology information comprising switch identifiers of one or more of the plurality of switches that are in each of a plurality of paths between the host device and the storage system;
detecting one or more failed ones of the plurality of paths from the host device to the storage system;
determining, based at least in part on the obtained topology information, switch identifiers for ones of the plurality of switches that are in the one or more failed ones of the plurality of paths; and
selecting a given one of the plurality of paths from the host device to the storage system through one or more of the plurality of switches based at least in part on the obtained topology information, the given path avoiding the ones of the plurality of switches that are in the one or more failed ones of the plurality of paths;
wherein the host device comprises a processor coupled to a memory.

9. The method of claim 8, wherein selecting the given path from the host device to the storage system through one or more of the plurality of switches based at least in part on the obtained topology information is performed for a given input-output operation associated with the host device.

10. The method of claim 8, wherein the topology information comprises connectivity information associated with each of the plurality of switches.

11. The method of claim 10, wherein the connectivity information associated with each of the plurality of switches comprises at least one identifier.

12. The method of claim 11, wherein a portion of the identifier is unique for each path initiator connected to a same one of the plurality of switches.

13. The method of claim 12, wherein the identifier enables the host device to select the given path that avoids said at least one of the plurality of switches associated with the one or more failed ones of the plurality of paths.

14. The method of claim 8, wherein switches of the plurality of switches are distributed among multiple fabrics.

15. A computer program product comprising a non-transitory processor-readable storage medium having stored therein program code of one or more software programs, wherein the program code, when executed by a host device comprising a processor coupled to a memory and configured to communicate with a storage system over a network with a plurality of switches, causes the host device to:
obtain topology information associated with the plurality of switches in the network, the obtained topology information comprising switch identifiers of one or more of the plurality of switches that are in each of a plurality of paths between the host device and the storage system;
detect one or more failed ones of the plurality of paths from the host device to the storage system;
determine, based at least in part on the obtained topology information, switch identifiers for ones of the plurality of switches that are in the one or more failed ones of the plurality of paths; and
select a given one of the plurality of paths from the host device to the storage system through one or more of the plurality of switches based at least in part on the obtained topology information, the given path avoiding the ones of the plurality of switches that are in one or more failed ones of the plurality of paths.

16. The computer program product of claim 15, wherein selecting the given path from the host device to the storage system through one or more of the plurality of switches based at least in part on the obtained topology information is performed for a given input-output operation associated with the host device.

17. The computer program product of claim 15, wherein the topology information comprises connectivity information associated with each of the plurality of switches.

18. The apparatus of claim 1 wherein the given path avoids at least one non-failed one of the plurality of paths, the at least one non-failed one of the plurality of paths including a given one of the plurality of switches that is also in at least one of the one or more failed ones of the plurality of paths.

19. The method of claim 8 wherein the given path avoids at least one non-failed one of the plurality of paths, the at least one non-failed one of the plurality of paths including a given one of the plurality of switches that is also in at least one of the one or more failed ones of the plurality of paths.

20. The computer program product of claim 15 wherein the given path avoids at least one non-failed one of the plurality of paths, the at least one non-failed one of the plurality of paths including a given one of the plurality of switches that is also in at least one of the one or more failed ones of the plurality of paths.

* * * * *